United States Patent [19]

Tomie

[11] Patent Number: 5,293,396
[45] Date of Patent: Mar. 8, 1994

[54] PLASMA GENERATING APPARATUS AND METHOD FOR EXTREME-ULTAVIOLET LASER

[75] Inventor: Toshihisa Tomie, Tsukuba, Japan

[73] Assignee: Agency of Industrial Science and Technology, Tokyo, Japan

[21] Appl. No.: 913,174

[22] Filed: Jul. 14, 1992

[30] Foreign Application Priority Data

Jul. 19, 1991 [JP] Japan .................................. 3-204734

[51] Int. Cl.$^5$ ............................................... H01S 3/30
[52] U.S. Cl. .......................................... 372/5; 372/55
[58] Field of Search .................. 372/5, 55, 89, 90, 91, 372/103, 701; 315/111.21, 111.81

[56] References Cited

U.S. PATENT DOCUMENTS

| | | | |
|---|---|---|---|
| 4,229,708 | 10/1980 | Mani et al. ................................. | 372/5 |
| 4,258,334 | 3/1981 | McCusker et al. ...................... | 372/5 |
| 4,369,514 | 1/1983 | Silfvast et al. . | |
| 4,441,189 | 4/1984 | Macklin et al. . | |
| 4,592,064 | 5/1986 | Silfvast .................................... | 372/5 |
| 4,771,430 | 9/1988 | Suckewer et al. ...................... | 372/5 |
| 4,862,100 | 8/1989 | Lavarini et al. ........................ | 372/90 |
| 4,870,653 | 9/1989 | Sher et al. ............................... | 372/5 |
| 4,945,546 | 7/1990 | Gole et al. .............................. | 372/89 |
| 5,003,543 | 3/1991 | Morsell et al. ......................... | 372/5 |
| 5,117,432 | 5/1992 | Nilsen ..................................... | 372/5 |

OTHER PUBLICATIONS

McCorkle et al.; "Physical Properties of an Electron Beam-Sliding Spark Device"; *Rev. Sci. Instrum;* vol. 48, No. 8; Aug. 1977; pp. 1055–1063.

T. Tomie, et al., "Three-Dimensional Readout of Flash X-ray Images of Living Sperm in Water by Atomic-Force Microscopy", May 3, 1991, pp. 691–693.

C. Chenais-Popovics et al., "Laser Amplification at 18.2 nm in Recombining Plasma from a Laser-Irradiated Carbon Fiber", Nov. 9, 1987, vol. 59, No. 19, pp. 2161–2164, *Physical Review Letters.*

Toshihisa Tomie et al., "Space Resolved Observation of Population Inversion, Electron Temperature, and Opacity of a Recombining Carbon Plasma", 1990, pp. 325–328, *Inst. Phys. Conf. Ser. No. 116.*

W. T. Silfvast et al., "Ultra-High-Gain Laser-Produced Plasma Laser In Xenon Using Periodic Pumping", Nov. 29, 1978, pp. 213–215, *Appl. Phys. Lett. 34*(3), Feb. 1, 1979.

*Primary Examiner*—Rodney B. Bovernick
*Assistant Examiner*—Robert E. Wise
*Attorney, Agent, or Firm*—Oliff & Berridge

[57] ABSTRACT

A plasma generating apparatus for an extreme-ultraviolet laser that can generate high temperature plasma at high efficiency, and can form long plasma to be recombined by rapid cooling of the high temperature plasma. A shield plate including a narrow slit is disposed adjacent to a high temperature plasma source, and the high temperature plasma is discharged through the slit. Both high efficiency plasma generation and rapid expansion thereof can be simultaneously achieved by discharging high temperature plasma through the narrow slit. The rapid expansion makes it possible to form a long plasma having a large gain in an extreme-ultraviolet region. The high temperature plasma source can be readily realized by irradiating it with an exciting laser beam from behind the opposite side of the slit with regard to the high temperature plasma source directly or through a transmitting window. A closure provided in front of the slit can prevent a liquid or gas from flowing out of the slit before it is changed into plasma. This makes it possible to use a liquid or gas as a plasma source material.

18 Claims, 2 Drawing Sheets

PLASMA GENERATING APPARATUS AND METHOD FOR EXTREME-ULTAVIOLET LASER

BACKGROUND OF THE INVENTION

1. Field of the Invention

The present invention relates to a plasma generating apparatus and method for an extreme-ultraviolet laser.

2. Description of the Related Art

Since the invention of a laser, efforts to shorten wavelengths of lasers have been continued, and as the wavelengths of lasers have been shortened, fields of laser application have been gradually widened. Recently, in particular, extreme-ultraviolet lasers (which are often called an "X-ray laser") whose wavelength is less than 100 nm, have been extensively studied. To shorten the wavelengths of lasers, a great exciting power no less than fourth power of the reciprocal of a laser wavelength is required. This presents many physical and technical problems that must be solved before an extreme-ultraviolet laser is realized. One promising extreme-ultraviolet laser is a recombination laser. This laser attempts to achieve an extreme-ultraviolet amplification by rapidly cooling a high temperature plasma. The most rapid cooling method is an adiabatic expansion cooling, if the size of the initial hot plasma is small enough. This method is based on the principle that the temperature drop takes place when gases are subjected to free expansion because thermal motion of particles are changed into translational motion, accompanying the density reduction by the expansion. To achieve sufficient amplification of an extreme-ultraviolet laser, the degree of population inversion achieved in nonequilibrium state must be great. This requires that the temperature of a plasma must be dropped faster than the speed of progress toward the thermal equilibrium. That is, a rapid expansion is required.

A greater density reduction is accomplished when a cylindrical plasma expands radially than when a plane plasma expands linearly. Accordingly, greater amplification power of an extreme-ultraviolet laser will be expected with a cylindrical plasma. The difference anticipated with the plane plasma and the cylindrical plasma has been experimentally confirmed (T. Tomie et al., X-ray lasers 1990, ed. by G. Tallents, Institute of Physics Conference Series 116, 1990). The cylindrical plasma from which a rapid expansion is expected can be generated by irradiating a thin fiber by an exciting laser. It was experimentally confirmed that 18 nanometer extreme-ultraviolet light was amplified using a seven micrometer diameter carbon fiber as a target (C. Chenais-Popovics, et al., Physical Review Letters, volume 59, number 19 (1987)).

Although C. Chenais-Popovics et al., reported a moderate degree of amplification of extreme ultraviolet light of 18 nanometer wavelength using a seven micrometer diameter by eight millimeter long carbon fiber as a target, several centimeter long plasma is required to achieve a sufficient amplification and to realize a practical extreme-ultraviolet laser of sufficient energy. Since light travels in straight lines, the plasma must also maintain the straightness in order to amplify extreme-ultraviolet light rays. However, it is inevitable for a thin, seven micrometer diameter fiber to bend, and hence, it is almost impossible to generate more than two centimeter long straight plasma by a fiber target. Furthermore, it is impossible for a thin fiber to absorb exciting laser energy with high efficiency: in experiments, absorption fractions less than only 10% have been achieved.

SUMMARY OF THE INVENTION

It is therefore an object of the present invention to provide a plasma generating apparatus and method for an extreme-ultraviolet laser that can generate a rapidly expanding straight plasma of sufficient length at high heating efficiency, thereby eliminating the above described problems.

According to a first aspect of the present invention, there is provided a plasma generating apparatus for an extreme-ultraviolet laser comprising a high temperature plasma source which generates a high temperature plasma, a shield plate including a slit through which the high temperature plasma of the high temperature plasma source is discharged, and exciting means for heating the high temperature plasma source from the opposite side of the slit.

Here, the exciting means may be an exciting laser beam, and the plasma generating apparatus may further comprise a window transmitting the exciting laser beam, the window and the shield plate forming a space between the window and the shield plate, the space confining a high temperature plasma generated by heating the high temperature plasma source with the exciting laser beam.

The exciting laser beam may irradiate the back of the high temperature plasma source from behind the window, and the slit is disposed in front of the high temperature plasma source.

The high temperature plasma source may be generated from a solid material.

The high temperature plasma source may be generated from a liquid material or a gaseous material.

The shield plate may further comprise closure means for closing the slit until discharge of the high temperature plasma.

According to a second aspect of the present invention, there is provided a plasma generating method for an extreme-ultraviolet laser comprising the steps of heating a material to generate a high temperature plasma source, the heating being carried out from behind the high temperature plasma source, and discharging, through a slit in front of the high temperature plasma source, the high temperature plasma of the high temperature plasma source.

According to a third aspect of the present invention, there is provided a recombination laser comprising at least one resonant laser cavity including a mirror and an output mirror, a high temperature plasma source which generates a high temperature plasma, a shield plate including a slit through which the high temperature plasma of the high temperature plasma source is discharged into the resonant laser cavity, and exciting means for heating the high temperature plasma source from the opposite side of the slit.

The plasma generating apparatus for an extreme-ultraviolet laser of the present invention comprises the high temperature plasma source and the shield plate including a narrow slit through which the high temperature plasma in the high temperature plasma source expands rapidly. Thus, it can generate a rapidly expanding straight plasma of a sufficient length.

In addition, the present invention may further comprise the window transmitting the exciting laser beam, which window confines the high temperature plasma within the space between the window and the shield plate.

Moreover, the closure may be provided on the shield plate to close the slit to employ a liquid or gas as a material for the plasma source.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

Figure 1:
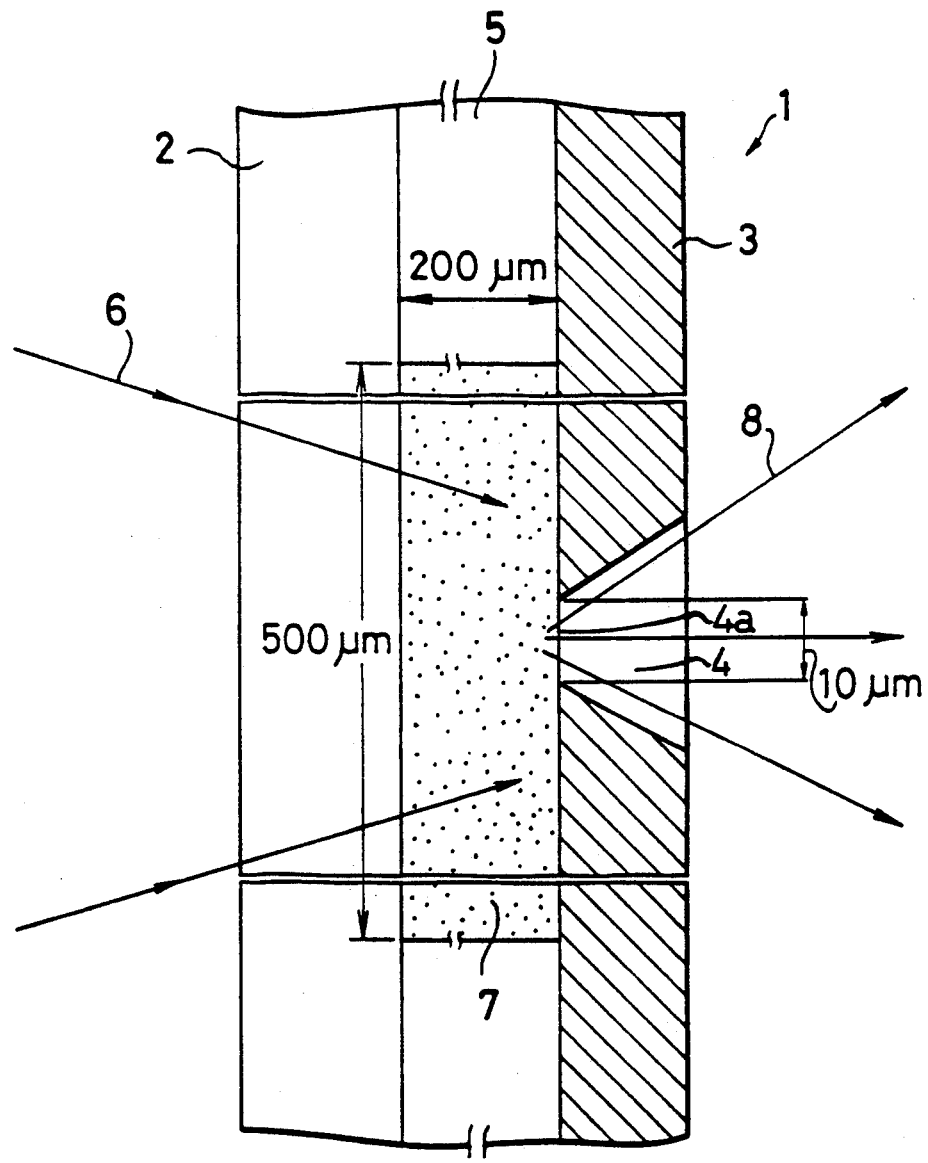
FIG. 1 is a sectional side view showing a major portion of an embodiment of a plasma generating apparatus for an extreme-ultraviolet laser according to the present invention.

FIG. 1 is a sectional side view showing an embodiment of a plasma generating apparatus for an extreme-ultraviolet laser according to the present invention.

Figure 2:
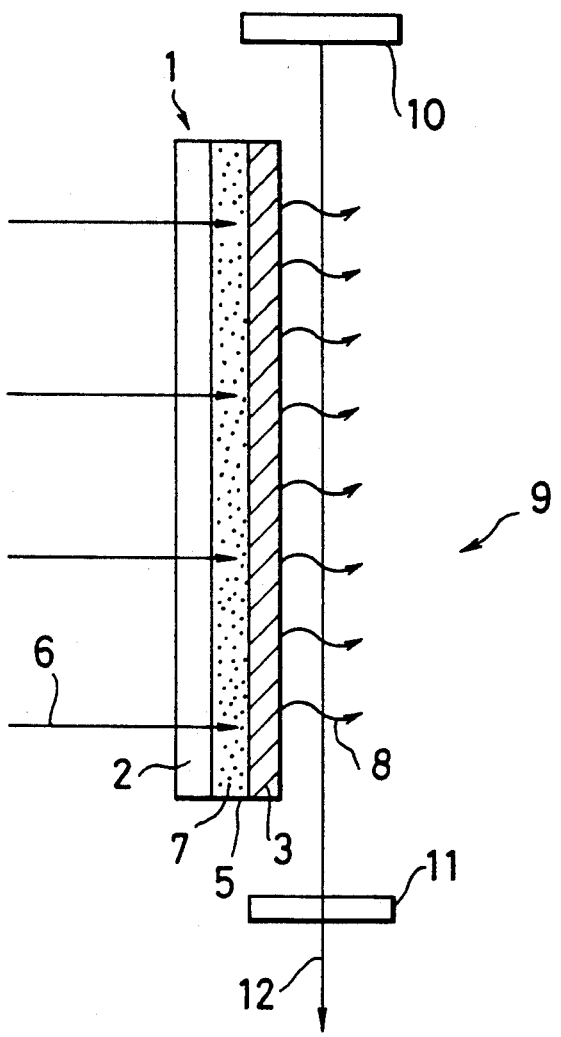
FIG. 2 is a schematic plan view showing a major portion of an extreme-ultraviolet laser incorporating the plasma generating apparatus of FIG. 1.

In this figure, reference numeral 1 designates a part of a plasma generating apparatus. The complete apparatus I comprises a plurality of such parts repeated in cascade as shown in FIG. 2. The plasma generating apparatus comprises a high temperature plasma source 7 and a shield plate 3. The plasma generating apparatus can further comprise a transmitting window 2 to confine the plasma source 7 within a space created by the shield plate 3, a spacer 5, and the window 2.

The shield plate 3 has a slit 4 which is about ten micrometers wide or less by several centimeters long in the direction normal to the sheet of FIG. 1. High temperature plasma in the high temperature plasma source 7 is discharged through the slit 4. The plasma source is generated by irradiating a material for the plasma source with an exciting laser beam 6. The wall of the space for the plasma source 7, thin film placed in the space, or a liquid or gas confined in the space can be a material for the plasma source. The material of the window 2 can be solid or plasma. It is not essential to use the transmitting window 2 when a material for the plasma source is solid. In this case, the window 2 can enhance the expansion velocity of the plasma through the slit 4.

When the solid transmitting window 2 is irradiated by the intense laser beam 6, the material making up the window 2 might be ionized into a plasma, which prevents the exciting laser beam 6 from reaching the material for the plasma source 7. To avoid this, the laser beam 6 is sharply focused onto the material of the plasma source 7 so that the density of the exciting laser beam 6 is reduced at the transmitting window 2. Alternatively, the transmitting window 2 can be a plasma initially made of a very thin film less than one micrometer thick. After the very thin film is ionized into a plasma by absorbing the laser beam 6, it can transmit the laser beam 6 when the density of the plasma is reduced by the expansion. The thin film plasma can have power to increase the discharging speed of the high temperature plasma from the slit 4. Furthermore, when a liquid or gaseous material is used as the material for plasma source 7, the thin film can prevent the effluent of the plasma source material out of the space prior to the irradiation of the exciting laser.

The space confining the high temperature plasma source 7 is several hundred micrometers both in width and thickness, although its sizes must be changed depending on the type of exciting lasers or other conditions. Although the high temperature plasma source 7 is usually generated by irradiating a solid material such as a carbon fiber or aluminum thin film with the exciting laser beam, any of the liquid, gaseous and solid materials can be employed as a material of the plasma source 7. For example, oxygen, carbon, nitrogen, etc., can be used. The walls of the space for the high temperature plasma source 7 might be ionized into a high temperature plasma source. Hence, the surface material of the walls must be such as not changing the composition of the high temperature plasma source 7.

The shield plate 3 is preferably made of silicon, through which the slit 4 is easily formed by etching process. Any other materials may be employed of which 10 micrometer wide or less by several centimeter long slit 4 can be formed. When a liquid or gaseous material is used as the high temperature plasma source 7, the slit 4 is closed in advance by a closure 4a made of a very thin film about 0.1 micrometer thick or less. Thus, the effluent of the liquid or gas from the space is prevented.

Various lasers can be employed as an exciting laser that emits the exciting laser beam 6, and is chosen considering the type of the extreme-ultraviolet laser to be implemented. To provide a rather long wavelength extreme-ultraviolet laser, a far-infrared carbon dioxide gas laser or an infrared glass laser is suitable for the exciting laser. In this case, the pulse width may range from several nanoseconds to several tens of nanoseconds. On the other hand, to produce a short wavelength extreme-ultraviolet laser, a short wavelength exciting laser such as an excimer laser that produces ultraviolet light is suitably used. In this case, a very short pulse of the order of picoseconds in width is thought to be appropriate, although a pulse a few nanoseconds wide or longer may also be used. The power of the laser also changes depending on the type of lasers and the kind of high temperature plasma source 7. When the high temperature plasma is composed of fully ionized carbon ions which are produced by exciting with glass laser pulses several nanoseconds wide, irradiation power of $10^{12}$ W/cm$^2$ is required. On the other hand, when the high temperature plasma is composed of fully ionized aluminum ions which are produced by exciting with excimer laser pulses several picoseconds wide, irradiation power of at least $10^{15}$ W/cm$^2$ is required.

Next, the operation of the apparatus will be described. The high temperature plasma in the high temperature plasma source 7 is discharged through the slit 4 of the shield plate 3, resulting in a rapid temperature drop of the plasma by expansion. This abrupt temperature drop provides the discharged plasma 8 in a transitional nonequilibrium state with power to amplify extreme-ultraviolet light rays. Thus, a laser amplification of extreme-ultraviolet light rays is achieved. A resonator 9 as shown in FIG. 2 can be incorporated to enhance the amplification.

The high temperature plasma source 7 can be generated by heating the material for the source with the exciting laser beam 6. When the high temperature plasma source is generated by irradiating a solid material, the high temperature plasma reaching the slit 4 is pressed by the pressure of plasma at the back, and is discharged through the slit 4, resulting in a rapid expansion. On the other hand, when the high temperature plasma is generated by irradiating a liquid or gaseous material, the slit 4 is closed in advance by the closure 4a made of a very thin film about 0.1 micrometer thick or less. This can prevent the liquid or gas from flowing out of the space confining the high temperature plasma source 7. Once the high temperature plasma source 7 is generated with the irradiation of the exciting laser beam 6, the closure 4a is broken by the pressure thereof, and the plasma discharges through the slit 4. The optimum temperature of the high temperature plasma source 7 is greatly different depending on the wavelength of the extreme-ultraviolet laser to be implemented: when its wavelength is about 20 nm, plasma temperature of about 100 eV (one million degrees) is required; and when its wavelength is about 4 nm, plasma temperature of about 1000 eV (ten million degrees) is required.

By using the transparent window 2 that transmits the exciting laser beam 6, the high temperature plasma source 7 can be confined within the space. This confinement of the high temperature plasma source 7 with the window 2 makes it possible to increase the discharge speed through the slit 4. To achieve a rapid density drop of the discharged plasma 8, the slit 4 must be extremely narrow.

Thus, the rapid expansion, which enables rapid cooling of the high temperature plasma source 7, can be realized by discharging the high temperature plasma source 7 through the narrow slit 4 formed in the shield plate 3. The use of the shield plate 3 which is far more robust than a fiber makes it possible to form the straight discharged plasma 8 of sufficient length. To generate the high temperature plasma source 7 behind the shield plate 3, the energy injection through the slit 4 must be avoided. This is because, although the high temperature plasma source 7 could be generated behind the shield plate 3 by injecting energy through the narrow slit 4, it is unavoidable for the energy to be absorbed by the shield plate 3, which will generate a new plasma surrounding the discharged plasma that prevents the plasma 8 discharged through the slit 4 from expanding rapidly.

The space for the high temperature plasma source behind the shield plate 3 need not to be so narrow: for example, one millimeter wide high temperature plasma source 7 can be discharged through the 10 micrometer wide slit 4. Therefore, the high temperature plasma source 7 is easily generated, and various steps can be taken to increase the energy injection efficiency of the plasma. For example, in the case where the exciting laser beam 6 cannot be focused smaller than a 100 micrometer diameter, a 10 micrometer diameter fiber employed as a target can use, in brief, only 10% of energy, wasting 90% of energy that does not irradiate the target. On the other hand, the total exciting energy can be used to generate the plasma by the present invention. When a fiber is used as a target, materials of the fiber are limited: only such materials that can be drawn into a thin straight fiber, or that can be deposited onto the straight thin fiber. The present invention, however, can employ not only various kinds of solid, but also liquids or gases, as a material for the plasma source. When a liquid or gas is employed as a material for the plasma source, the slit 4 must be closed so as to prevent the material from flowing out of the slit 4 before it is converted into a plasma by the injection of energy. This can be realized by closing the slit 4 in advance with a means like a thin film as stated before, or with a shutter that can open and close the slit 4 mechanically.

By irradiating the target in the space between the window 2 and the shield plate 3 with the exciting laser beam 6 through the window 2 which is made of a material transparent to the laser beam 6, the high temperature plasma source 7 to be discharged through the slit 4 can be effectively generated behind the shield plate 3. In this case, the material for the plasma source may be a solid material placed between the window 2 and the shield plate 3, or a gas or liquid target retained within the space. The irradiation of the exciting laser beam 6 onto the space retaining the plasma source can also be achieved by using the multiple reflections of mirrors, or by using optical fibers. In addition, confinement of the plasma by employing magnetic field is possible. As the energy source for generating the high temperature plasma source 7, heating with particle beam, Z pinch, the radio frequency or the like is possible.

The mass of the high temperature plasma source 7 will be declined by the discharge, when the irradiation with the exciting laser beam 6 is stopped. As a result, the pressure of the high temperature plasma source 7 also declines, resulting in the decrease in the discharging speed. In contrast, when the irradiation with the exciting laser beam 6 is continued, the mass of the high temperature plasma source 7 can be maintained at a fixed value. This will make it possible to implement an extreme-ultraviolet laser that oscillates continuously. In this case, however, the increase in a discharged plasma mass in front of the slit 4 might hinder the rapid expansion of the high temperature plasma through the slit 4, or hinder the operation of the extreme-ultraviolet laser. In order to alleviate this problem, intermittent irradiation of the exciting laser beam 6 will be effective.

In existing extreme-ultraviolet lasers employing a thin film, a slab or a fiber as a target, the duration of oscillation is on the order of subnanoseconds, or several tens of nanoseconds at most. The extreme-ultraviolet laser according to the present invention can provide a longer oscillating duration.

FIG. 2 is a schematic plan view showing a major portion of an extreme-ultraviolet laser incorporating the plasma generating apparatus of FIG. 1. In FIG. 2, like reference numerals designate like portions in FIG. 1. The extreme-ultraviolet laser further comprises a resonator 9, which is constructed by an extreme-ultraviolet light reflection mirror 10, and an extreme-ultraviolet light half mirror (an output mirror) 11. With this arrangement, an output 12 of the extreme-ultraviolet laser is produced from the output mirror 11.

Although a specific embodiment of a plasma generating apparatus and method for an extreme-ultraviolet laser constructed in accordance with the present invention has been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. A plasma generating apparatus for an extreme-ultraviolet laser comprising:
a high temperature plasma source which generates a high temperature plasma;

a shield plate including a slit through which said high temperature plasma of said high temperature plasma source is discharged; and exciting means for heating said high temperature plasma source from the opposite side of said slit.

2. The plasma generating apparatus for an extreme-ultraviolet laser as claimed in claim 1, wherein said exciting means is an exciting laser beam, and further comprising a window transmitting said exciting laser beam, said window and said shield plate forming a space between said window and said shield plate, said space confining a high temperature plasma generated by heating said high temperature plasma source with said exciting laser beam.

3. The plasma generating apparatus for an extreme-ultraviolet laser as claimed in claim 2, wherein said exciting laser beam irradiates the back of said high temperature plasma source from behind said window, and said slit is disposed in front of said high temperature plasma source.

4. The plasma generating apparatus for an extreme-ultraviolet laser as claimed in claim 1, wherein said high temperature plasma source is generated from a solid material.

5. The plasma generating apparatus for an extreme-ultraviolet laser as claimed in claim 1, wherein said high temperature plasma source is generated from a liquid material or a gaseous material.

6. The plasma generating apparatus for an extreme-ultraviolet laser as claimed in claim 5, wherein said shield plate further comprises closure means for closing said slit until discharge of said high temperature plasma.

7. A plasma generating method for an extreme-ultraviolet laser comprising the steps of:

heating a material to generate a high temperature plasma source, said heating being carried out from behind said high temperature plasma source; and discharging, through a slit in front of said high temperature plasma source, said high temperature plasma of said high temperature plasma source.

8. The plasma generating method for an extreme-ultraviolet laser as claimed in claim 7, wherein said heating is carried out by irradiation of an exciting laser beam transmitted through a window disposed behind said high temperature plasma source.

9. The plasma generating method for an extreme-ultraviolet laser as claimed in claim 8, wherein said exciting laser beam is irradiated to the back of said high temperature plasma source from behind said window.

10. The plasma generating method for an extreme-ultraviolet laser as claimed in claim 7, wherein said high temperature plasma source is generated from a solid material.

11. The plasma generating method for an extreme-ultraviolet laser as claimed in claim 7, wherein said high temperature plasma source is generated from a liquid material or a gaseous material.

12. The plasma generating method for an extreme-ultraviolet laser as claimed in claim 11, further comprising the step of closing said slit by a closure until discharge of said high temperature plasma.

13. A recombination laser comprising:

at least one resonant laser cavity including a mirror and an output mirror;

a high temperature plasma source which generates a high temperature plasma;

a shield plate including a slit through which said high temperature plasma of said high temperature plasma source is discharged into said resonant laser cavity; and exciting means for heating said high temperature plasma source from the opposite side of said slit.

14. The recombination laser as claimed in claim 13, wherein said exciting means is an exciting laser beam, and further comprising a window transmitting said exciting laser beam, said window and said shield plate forming a space between said window and said shield plate, said space confining said high temperature plasma generated by heating said high temperature plasma source with said exciting laser beam.

15. The recombination laser as claimed in claim 14, wherein said exciting laser beam irradiates the back of said high temperature plasma source from behind said window, and said slit is disposed in front of said high temperature plasma source.

16. The recombination laser as claimed in claim 13, wherein said high temperature plasma source is generated from a solid material.

17. The recombination laser as claimed in claim 13, wherein said high temperature plasma source is made generated from liquid material or a gaseous material.

18. The recombination laser as claimed in claim 17, wherein said shield plate further comprises closure means for closing said slit until discharge of said high temperature plasma.

* * * * *